United States Patent [19] [11] Patent Number: 6,042,177
Matushita et al. [45] Date of Patent: Mar. 28, 2000

[54] ROOF STRUCTURE FOR VEHICLE

[75] Inventors: Yousuke Matushita; Manabu Kikuchi, both of Hino, Japan

[73] Assignee: Hino Jidosha Kogyo Kabushiki Kaisha, Tokyo, Japan

[21] Appl. No.: 08/955,749

[22] Filed: Oct. 22, 1997

[30] Foreign Application Priority Data

Sep. 18, 1997 [JP] Japan .................................. 9-253383

[51] Int. Cl.⁷ .............................. B60J 7/00; B62D 25/07
[52] U.S. Cl. .......................... 296/210; 296/213; 296/191
[58] Field of Search ....................... 296/203.01, 203.03, 296/203.04, 210, 213, 190.08, 191, 29, 30

[56] References Cited

U.S. PATENT DOCUMENTS

| 1,767,465 | 7/1930 | Ledwinka ................................ 296/191 |
| 2,400,150 | 5/1946 | Jones et al. ............................ 296/29 X |
| 5,897,159 | 4/1999 | Nagasawa et al. ...................... 296/210 |
| 5,951,009 | 9/1999 | Nagasawa et al. ...................... 296/210 |

FOREIGN PATENT DOCUMENTS 63-61382  4/1988  Japan .
6-53372   7/1994  Japan .

*Primary Examiner*—D. Glenn Dayoan
*Assistant Examiner*—Patricia L. Engle
*Attorney, Agent, or Firm*—Oblon, Spivak, McClelland, Maier & Neustadt, P.C.

[57] ABSTRACT

In a roof structure for a vehicle, a side outer member and a roof member are combined at their side portions to provide a groove extending over at least midway of a boundary between the side outer and roof members. Each of the side outer and roof members comprises has exposed and unexposed surface portions: each of the unexposed surface portions has an inward bend and a lower margin. The side outer and roof members are overlapped at their exposed surface portions to provide an overlap such that a corner defined by the exposed and unexposed surface portions of the roof member is substantially aligned with a corner defined by the exposed and unexposed surface portions of the side outer member. The unexposed surface portions of the side outer and roof members are diagonal toward a center of a roof in a widthwise direction of the roof as they are away from the corners. At least one of the inward bends and lower margins of the side outer and roof members has a lug for overlap to provide a partial overlap.

3 Claims, 12 Drawing Sheets

ROOF STRUCTURE FOR VEHICLE

BACKGROUND OF THE INVENTION

1. Field of the Invention

The present invention relates to a roof structure for a vehicle.

2. Description of the Related Art

A roof structure with a drip channel has been prevailingly adopted for a vehicle such as a passenger car or truck.

An example of such roof structure with a drip channel is shown in FIGS. 1 to 4.

More specifically, for a door opening 2 in a vehicle body 1 as shown in FIG. 1, a drip channel 4 is spot-welded at point 5 as shown in FIG. 2 to a side outer member 3 which provides a lateral surface of a car cabin. A roof member 6 is placed on the member 3 from right above and is spot-welded at point 7 to the drip channel 4.

A pillar 8 as shown in FIG. 1 is provided such that the roof member 6 placed on the member 3 from right above is coupled to the member 3 at point 9 by brazing or arc brazing as shown in FIGS. 3 and 4.

In FIGS. 2 and 3, there is shown a side inner member 10.

With the above arrangement, the members 6 and 3 are to be vertically coupled together at the pillar 8 so that placement of the member 6 on the member 3 from right above causes no structral problems; however, there are problems in that the drip channel 4 is needed to mount the member 6 and that troublesome working such as brazing or arc brazing is required.

For this reason, a roof structure with no drip channel has been proposed and employed in recent years.

In this roof structure with no drip channel, as shown in FIGS. 5 to 8, a boundary between a roof member 11 and a side outer member 12 is not at the pillar 8 but at a roof 14. The members 11 and 12 are respectively formed with groove-defining side walls 15 and 17 and groove-defining bottoms 16 and 18. The bottom 16 of the member 11 is placed on and spot-welded to the bottom 18 of the member 12 to provide the boundary in the form of a groove 20 substantially extending in a longitudinal direction 19 of the vehicle. The groove 20 is filled with molding (not shown) made of rubber or synthetic resin to hide the boundary.

Thus, the use of the roof structure with no drip channel eliminates the need for the drip channel 4 as well as troublesome working such as brazing or arc brazing.

However, the roof structure with no drip channel as described has a below-mentioned disadvantage.

Generally, as seen in FIG. 5, a vehicle has, on its front and rear sides, windows 21 (particularly, a substantially vertical window on the rear side in the case of a pickup truck). Accordingly, the members 11 and 12 must be provided at their longitudinal ends with unexposed surface portions 26 and 27 as shown in FIG. 6 which comprise inward bends 22 and 23 for engagement with a pane of glass for the window 21 and lower margins 24 and 25 for support of the glass pane, respectively.

The unexposed surface portions 26 and 27 are inevitably receded relative to exposed surface portions 28 and 29 of the roof 14. Hence, there is a fair possibility that the roof member 11 cannot be placed on the side outer member 12 from right above since the unexposed surface portion 26 of the member 11 interferes at space 30 with the exposed and unexposed portions 29 and 27 of the member 12.

SUMMARY OF THE INVENTION

The present invention was made in view of the above problems and has its object to provide a roof structure for a vehicle in which a roof member can be placed on and coupled to a side outer member with no trouble.

The present invention provides a roof structure for a vehicle which comprises a side outer member and a roof member combined at side portions thereof to provide a groove extending over at least midway of a boundary between said members, each of said side outer and roof members having exposed and unexposed surface portions, each of said unexposed surface portions of said side outer and roof members having an inward bend and a lower margin, said side outer and roof members being overlapped at their exposed surface portions to provide an overlap such that a corner defined by the exposed and unexposed surface portions of said roof member is substantially aligned with a corner defined by the exposed and unexposed surface portions of the side outer member, said unexposed surface portions of said side outer and roof members being diagonal toward a center of a roof in a widthwise direction of the roof as they are away from said corners, at least one of said inward bends and lower margins of said side outer and roof members having a lug for overlap to provide a partial overlap.

Thus, the roof member can be placed on and coupled to the side outer member from right above without any trouble since the unexposed surface portion of the roof member does not interfere with the exposed and unexposed portions of the side outer member.

Moreover, overlap of at least either the inward bends or the lower margins of the side outer and roof members through a lug or lugs can assure a sealer application operation to the very overlap, thereby substantially improving the waterproof property. The lug or lugs further makes it possible to temporarily position the roof member. This temporary positioning may substantially improve the operation efficiency in coupling the roof member to the side outer member.

Preferably, the side portion of the side outer member which provides the overlap is partly curved outwardly in the widthwise direction at a position adjacent to the unexposed surface portion of the member to thereby offset the alignment of the corners between the exposed and unexposed portions of the side outer and roof members outwardly in the widthwise direction so that the side outer member is not, even at its lowermost edge, beyond its inherent width necessary for the overlap.

In this manner, the unexposed surface portion of the side outer member is not beyond the width of the side outer member necessary for the overlap, i.e., the inherent width of the side outer member necessary for construction of the roof structure with no drip channel, so that the cost for or the yield in manufacture of the side outer member can be substantially improved.

Preferred embodiments of the present invention will be described in conjunction with the drawings.

DETAILED DESCRIPTION OF THE PREFERRED EMBODIMENTS

Figure 1:
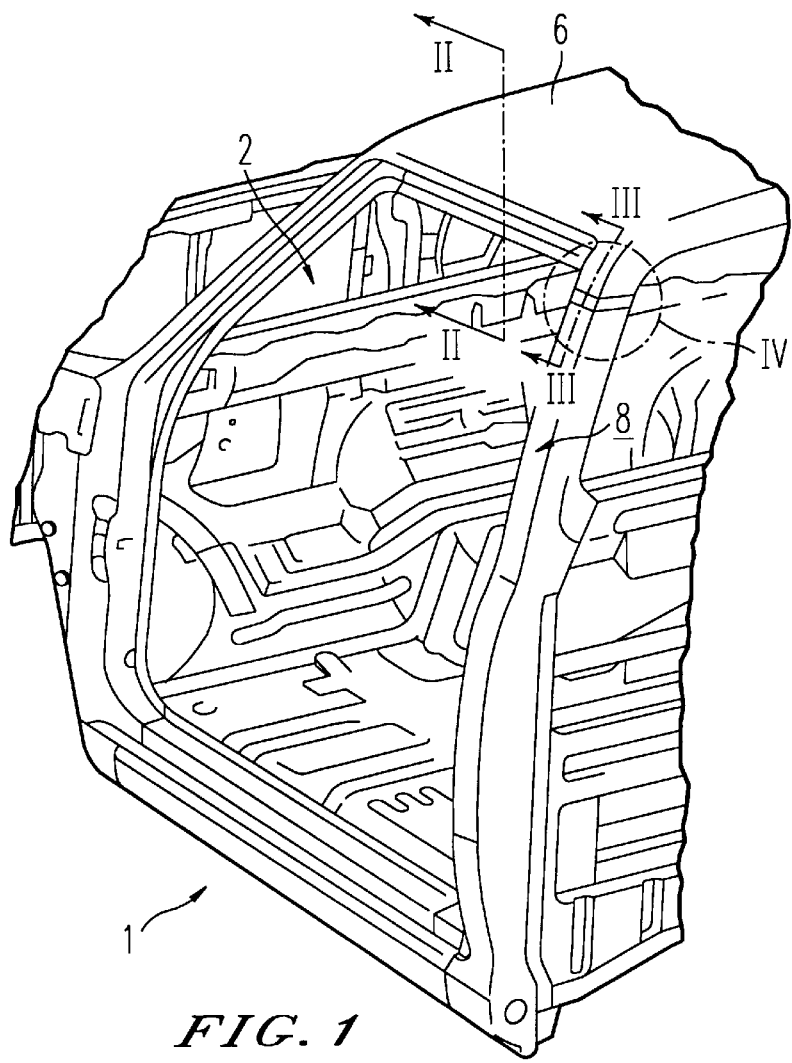
FIG. 1 is a partial perspective view of a vehicle body having a conventional roof structure with a drip channel.
Figure 2:
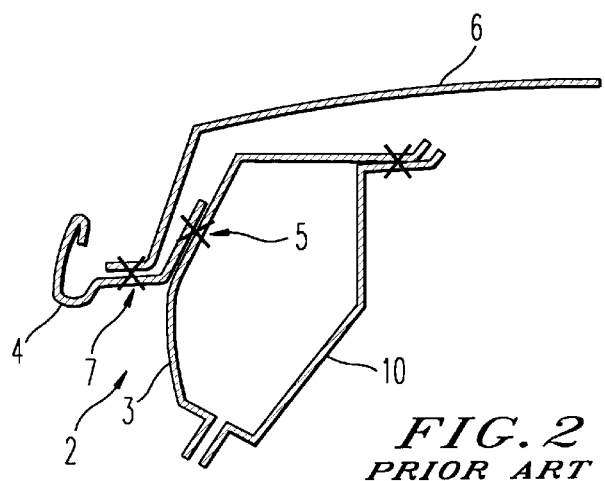
FIG. 2 is a view taken along the line II—II in FIG. 1.
Figure 3:
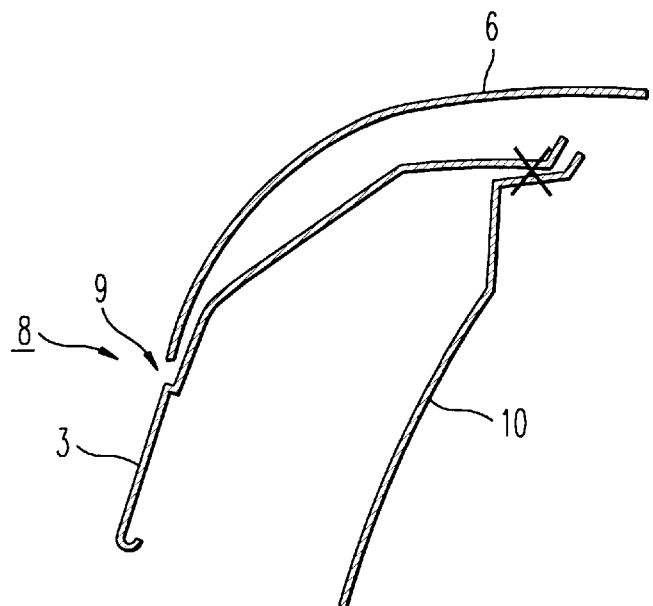
FIG. 3 is a view taken along the line III—III in FIG. 1.
Figure 4:
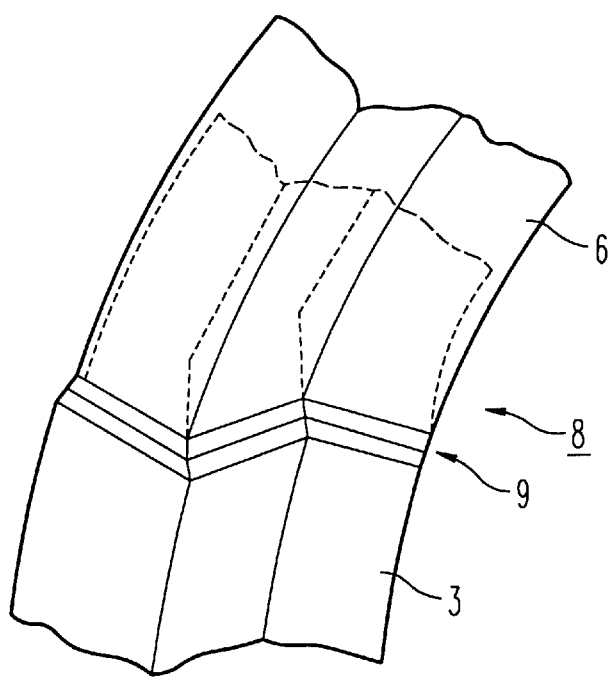
FIG. 4 is an enlarged view of a portion IV in FIG. 1.
Figure 5:
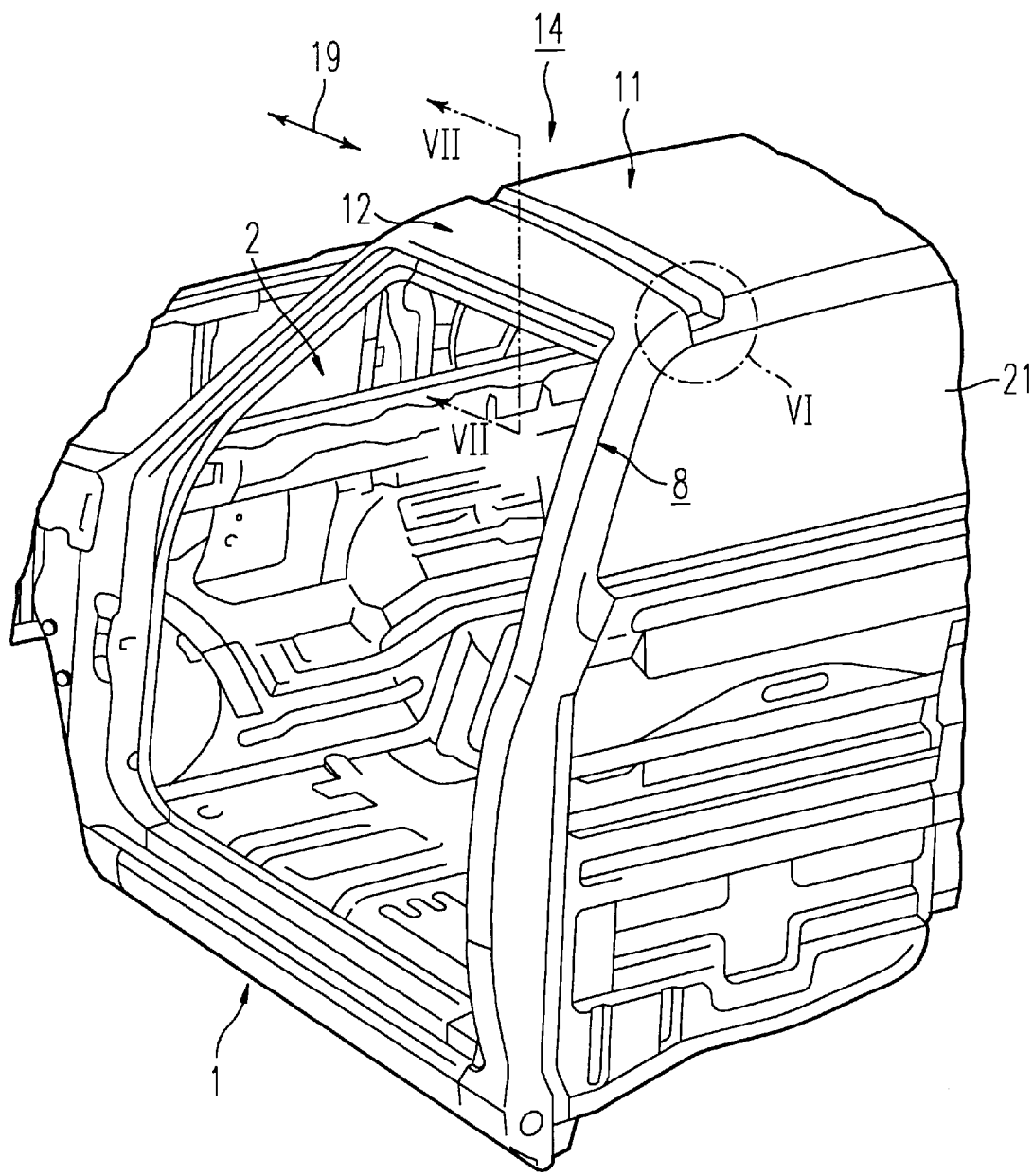
FIG. 5 is a partial perspective view of a vehicle body having a conventional roof structure with no drip channel.
Figure 6:
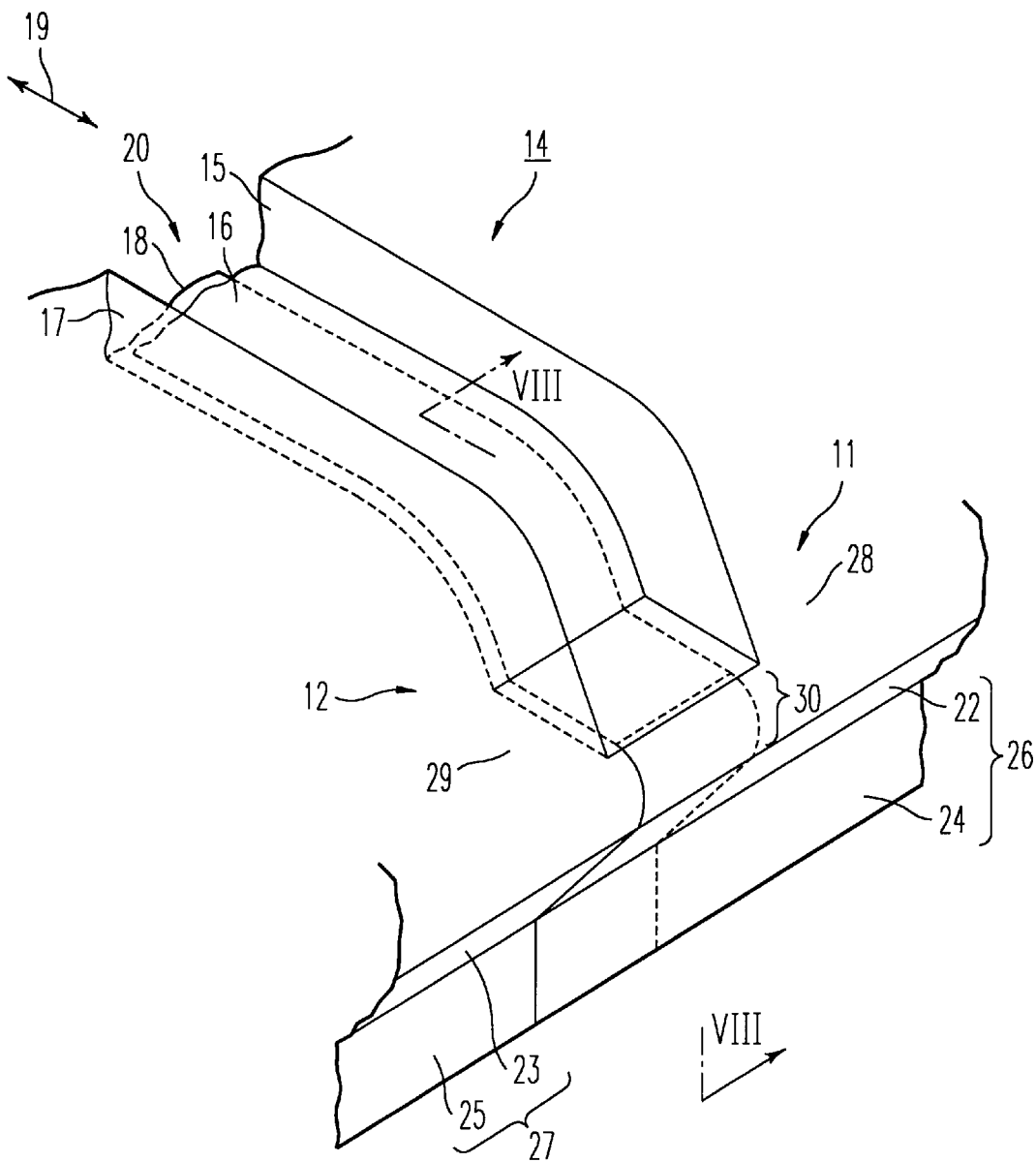
FIG. 6 is an enlarged view of a portion VI in FIG. 5.
Figure 7:
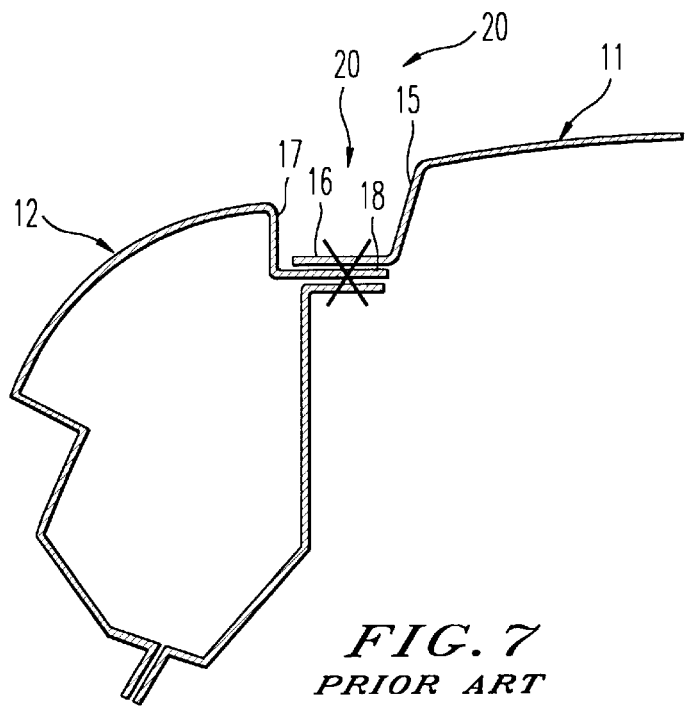
FIG. 7 is a view taken along the line VII—VII in FIG. 5.
Figure 8:
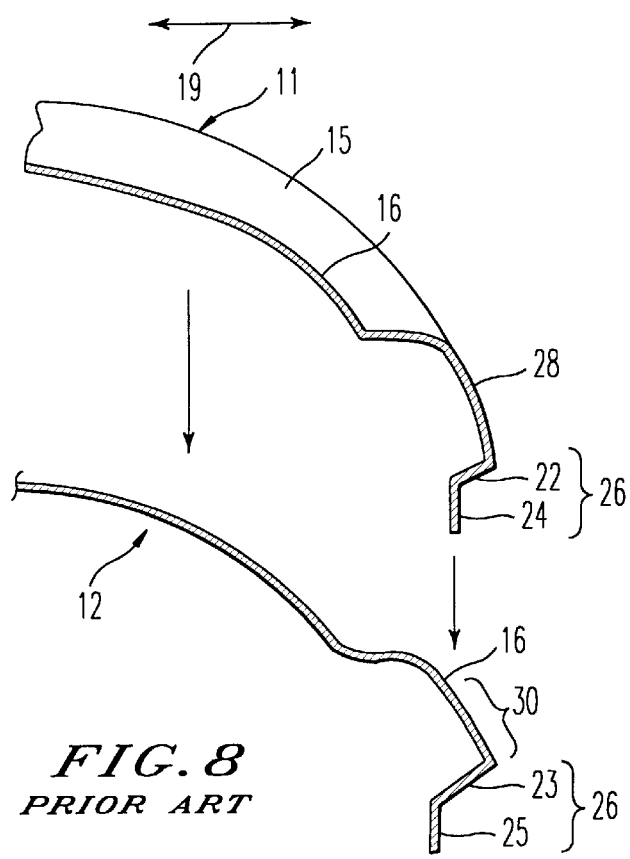
FIG. 8 is a view taken along the line VIII—VIII in FIG. 6.
Figure 9:
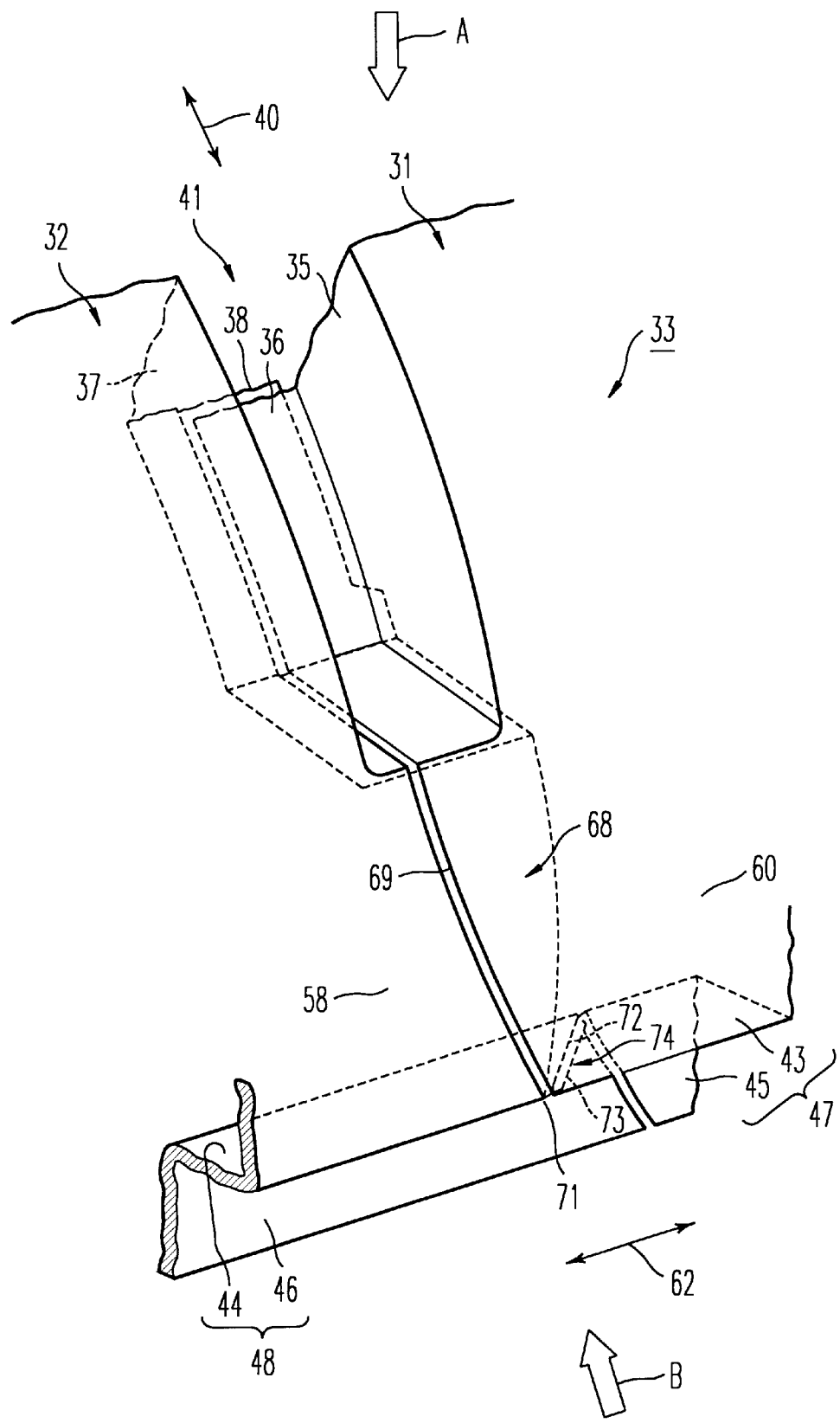
FIG. 9 is a partially enlarged perspective view of a first embodiment of the present invention.
Figure 10:
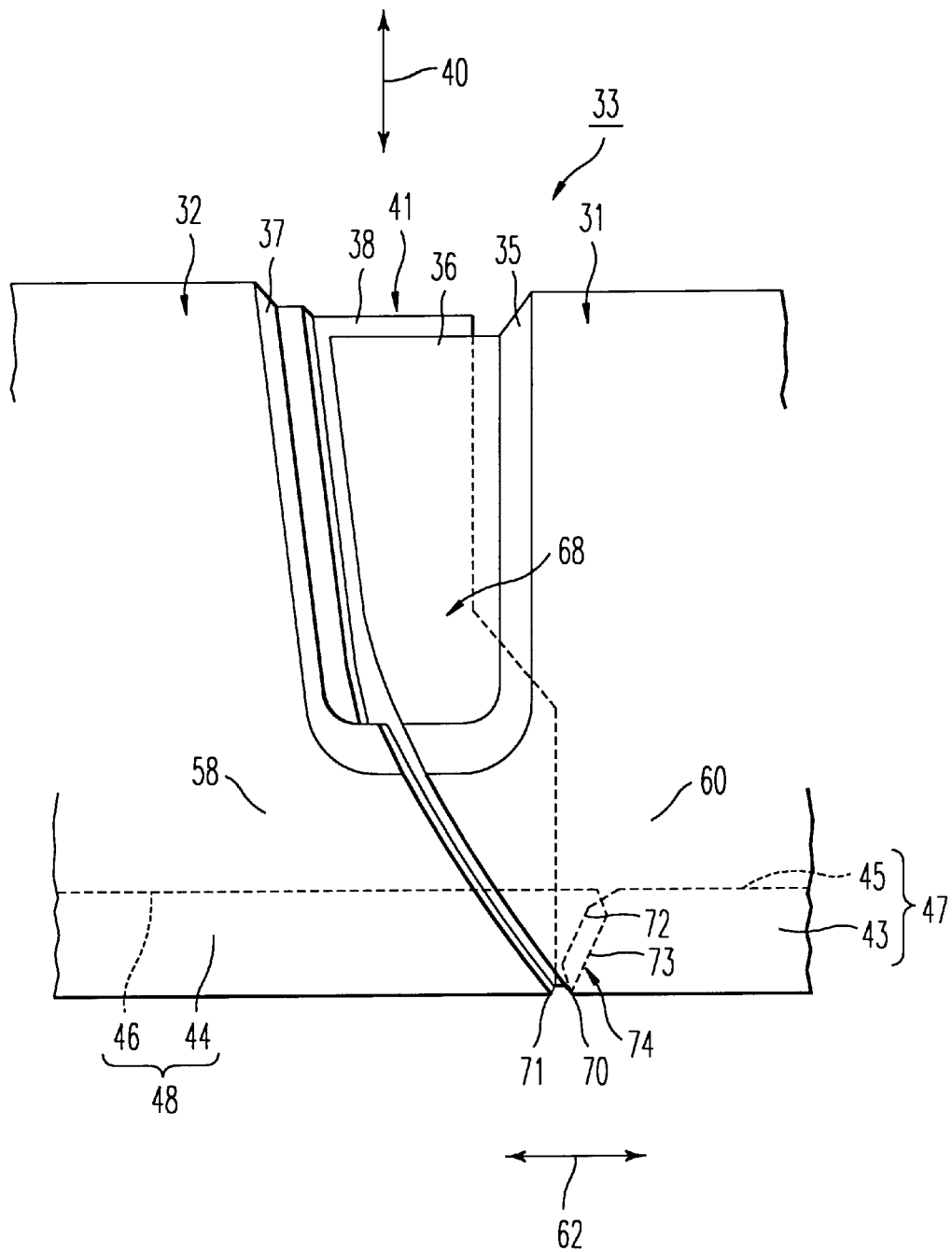
FIG. 10 is a plan view looking from above in the direction of the arrow A in FIG. 9.
Figure 11:
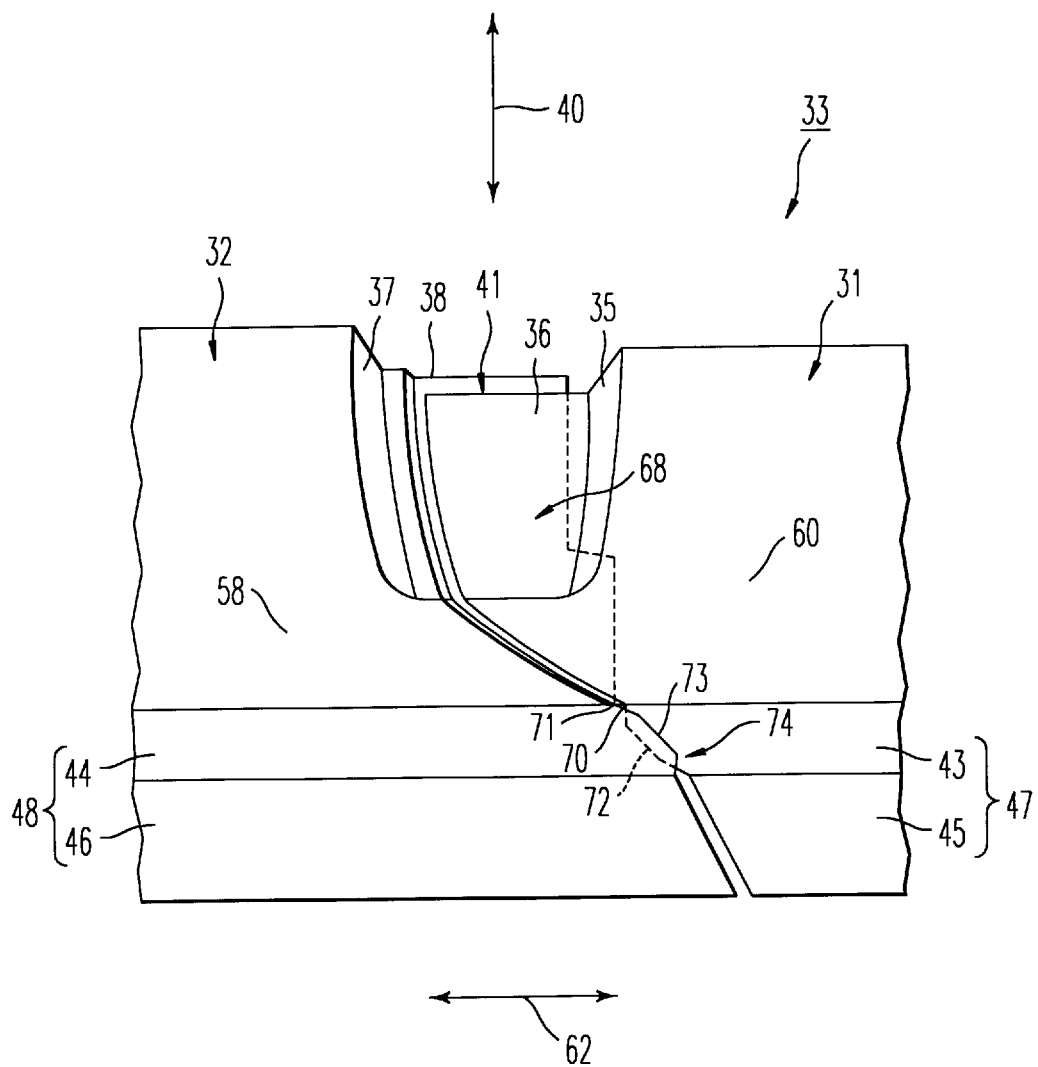
FIG. 11 is a perspective view looking from below in the direction of the arrow B in FIG. 9.

A first embodiment of a roof structure for a vehicle according to the present invention as shown in FIGS. 9 to 11 adopts a roof structure with no drip channel which has been fundamentally summarized in the above description with reference to FIGS. 5 and 6. More specifically, in a vehicle such as a passenger car or truck, a boundary between a roof member 31 and a side outer member 32 is located at a roof 33. The members 31 and 32 are respectively formed at their side portions with groove-defining side walls 35 and 37 and groove-defining bottoms 36 and 38 each of which extend over a majority of the length of the corresponding member except for a longitudinal (front and/or rear) end or ends of the same. The bottom 36 of the roof member 31 is placed on and spot-welded to the bottom 38 of the side outer member 32 at a seam 69 to thereby provide the boundary in the form of a groove 41 extending over a majority of the length of the members 31 and 32 in a longitudinal direction 40 of the vehicle except for the longitudinal front and/or rear end or ends of the members 31 and 32. The groove 41 is filled with molding (not shown) made of rubber or synthetic resin. Thus, the roof structure with no drip channel is provided. Each of the bottoms 36 and 38 has substantially the same width as that of the groove 41 throughout the length of the bottom.

The members 31 and 32 are respectively provided at each of their longitudinal front and rear ends with unexposed surface portions 47 and 48 which comprise inward bends 43 and 44 for engagement with a pane of glass for a window (a windshield or a rear window) and lower margins 45 and 46 for support of the glass pane.

In this embodiment, exposed surface portions 60 and 58 of the members 32 and 31 provide an overlap 68 such that the exposed surface portion 60 of the member 32 is diagonally formed to be downwardly directed toward a center of the roof 33 in a widthwise direction 62 of the roof (right side in FIGS. 9–11) and that a corner 70 defined by the exposed and unexposed portions 60 and 47 of the member 31 is substantially aligned with a corner 71 defined by the exposed and unexposed surface portions 58 and 48 of the member 32.

The unexposed surface portions 48 and 47 of the members 32 and 31 are diagonally formed to be directed toward the center of the roof 33 in the widthwise direction 62 (right side in FIGS. 9–11) as they are away from the corners 71 and 70. The inward bends 44 and 43 of the unexposed surface portions 48 and 47 of the members 32 and 31 have lugs 73 and 72, respectively, which are mutually overlapped to provide a partial overlap 74.

In this embodiment, the lower margins 46 and 45 of the unexposed surface portions 48 and 47 are in the form of abutments which are abutted and joined together.

According to this embodiment, the roof member 31 can be placed on and coupled to the side outer member 32 from right above without any trouble since the unexposed surface portion 47 of the member 31 does not interfere with the exposed and unexposed portions 58 and 48 of the side outer member 32.

Moreover, overlap of the inward bends 44 and 43 of the members 32 and 31 at their lugs 73 and 72 can assure a sealer application operation to the very overlap, thereby substantially improving the waterproof property.

Lack of the lugs 73 and 72 for overlap might cause the applied sealer to pass through any gap between the inward bends 44 and 43 of the members 32 and 31, resulting in failure of positive or assured waterproof property.

The lugs 73 and 72 further make it possible to temporarily position the roof member 31. This temporary positioning may substantially improve the operation efficiency in coupling the roof member 31 to the side outer member 32.

Figure 12:
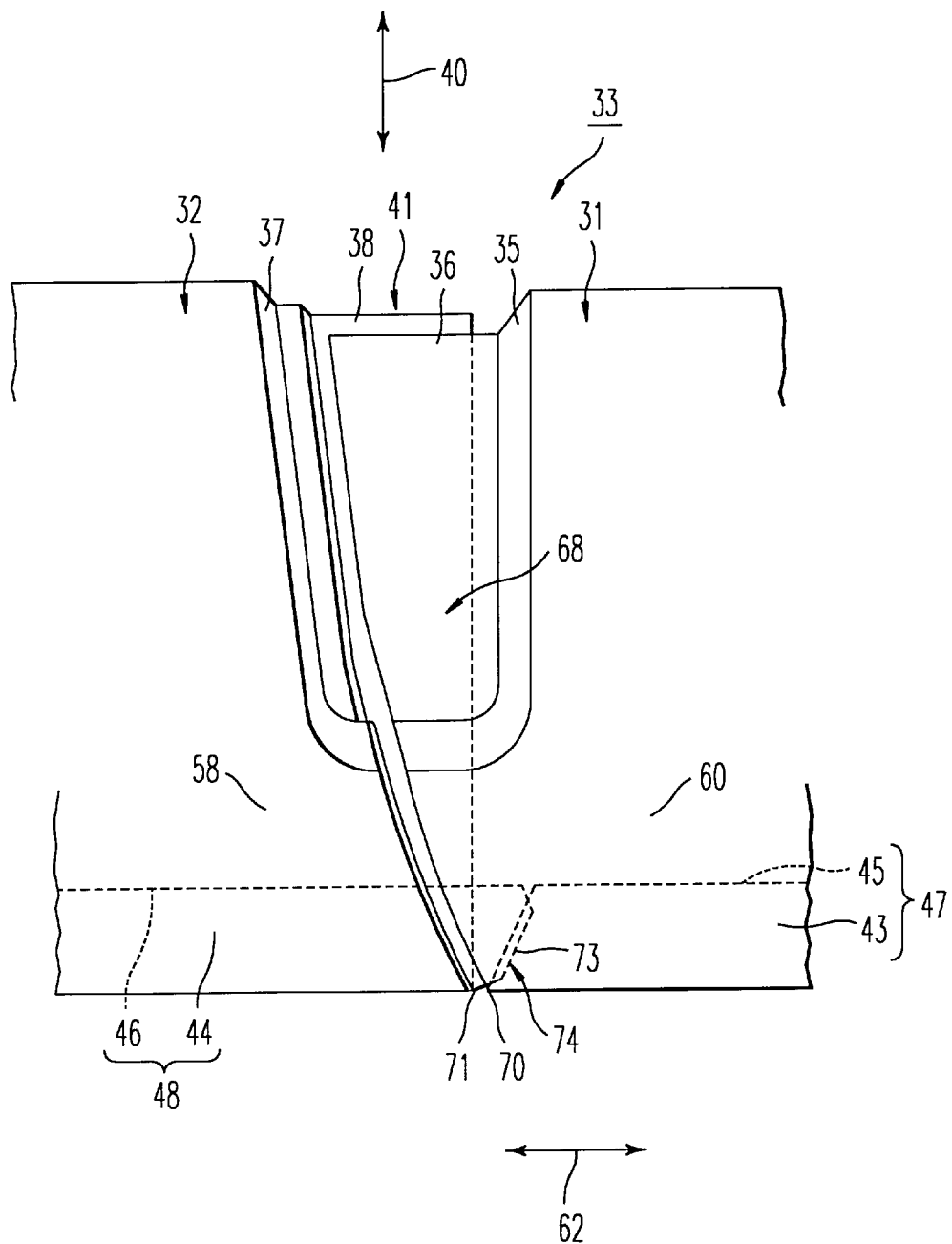
FIG. 12 is a plan view of a second embodiment of the present invention.
Figure 13:
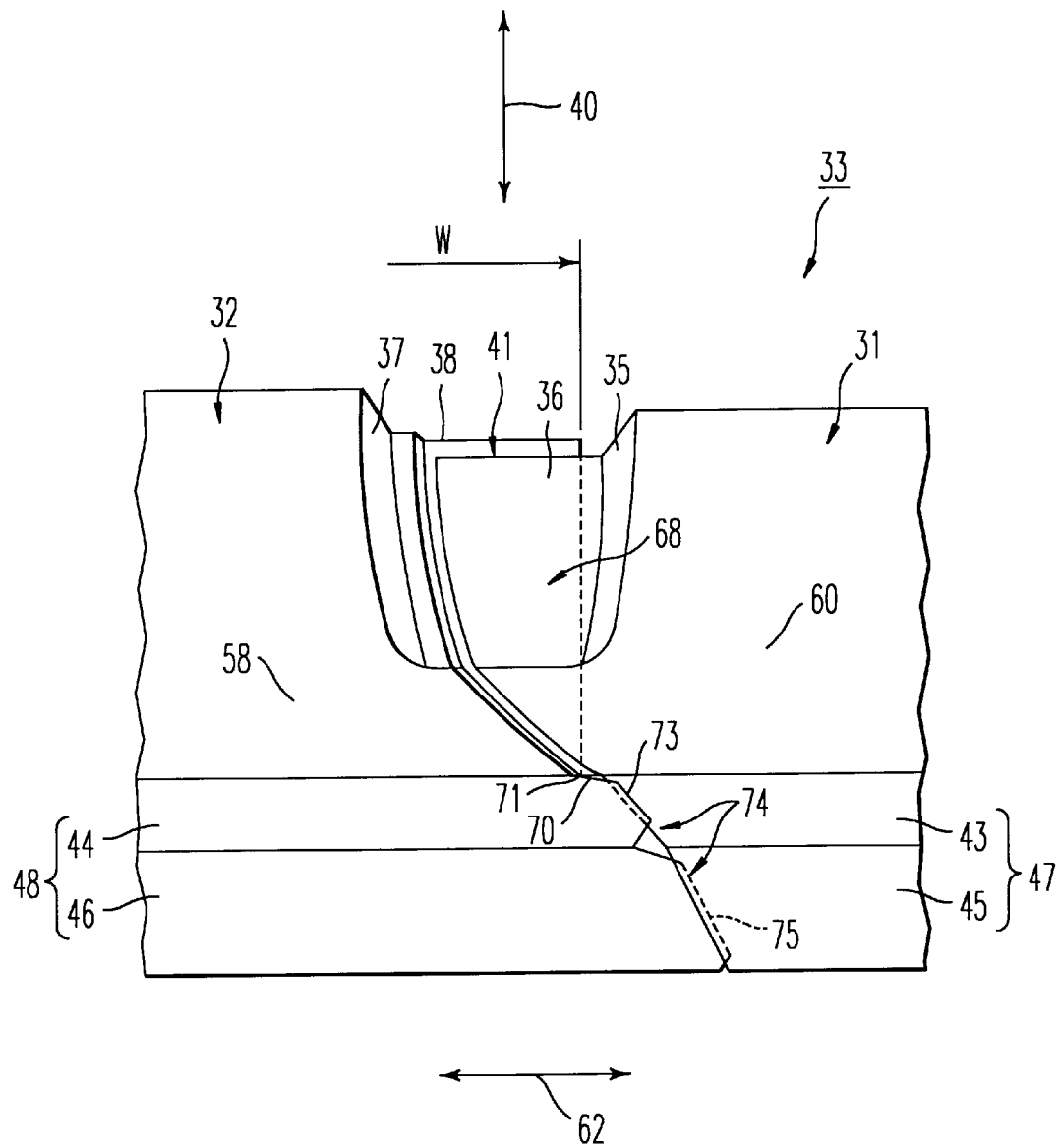
FIG. 13 is a perspective view looking from below so as to show unexposed surface portions in FIG. 12.

FIGS. 12 and 13 show a second embodiment of the present invention. FIG. 12 is a plan view and FIG. 13 is a perspective view looking from below so as to show unexposed surface portions 48 and 47 in FIG. 12.

While in the first embodiment the corner 70 of the member 31 is in alignment with the corner 71 of the member 32 at the position inwardly of the groove 41 toward the center of the roof in the widthwise direction 62, the second embodiment resides in that the side portion of the outer member 32 is straight in a longitudinal direction 40 of the vehicle so as to attain alignment of the corner 70 with the corner 71 at a position within extension of the groove 41 and that only the inward bend 44 and lower margin 46 of the side outer member 32 have lugs 73 and 75 for provision of the partial overlaps 74, respectively.

Thus, in addition to the advantages similar to those of the first embodiment, the second embodiment attains further advantages that an extra margin of the unexposed surface portion 48 of the side outer member 32 beyond width W in FIG. 13 of the member 32 necessary for the overlap 68, i.e., the inherent width W of the member necessary for the roof structure with no drip channel, toward the center of the roof in the widthwise direction 62, can be minimized to improve the yield upon manufacturing of the member 32 and that the unexposed surface portions 48 and 47 of the members 32 and 31 can be overlapped both at the inward bends 44 and 43 and at the lower margins 46 and 45.

Figure 14:
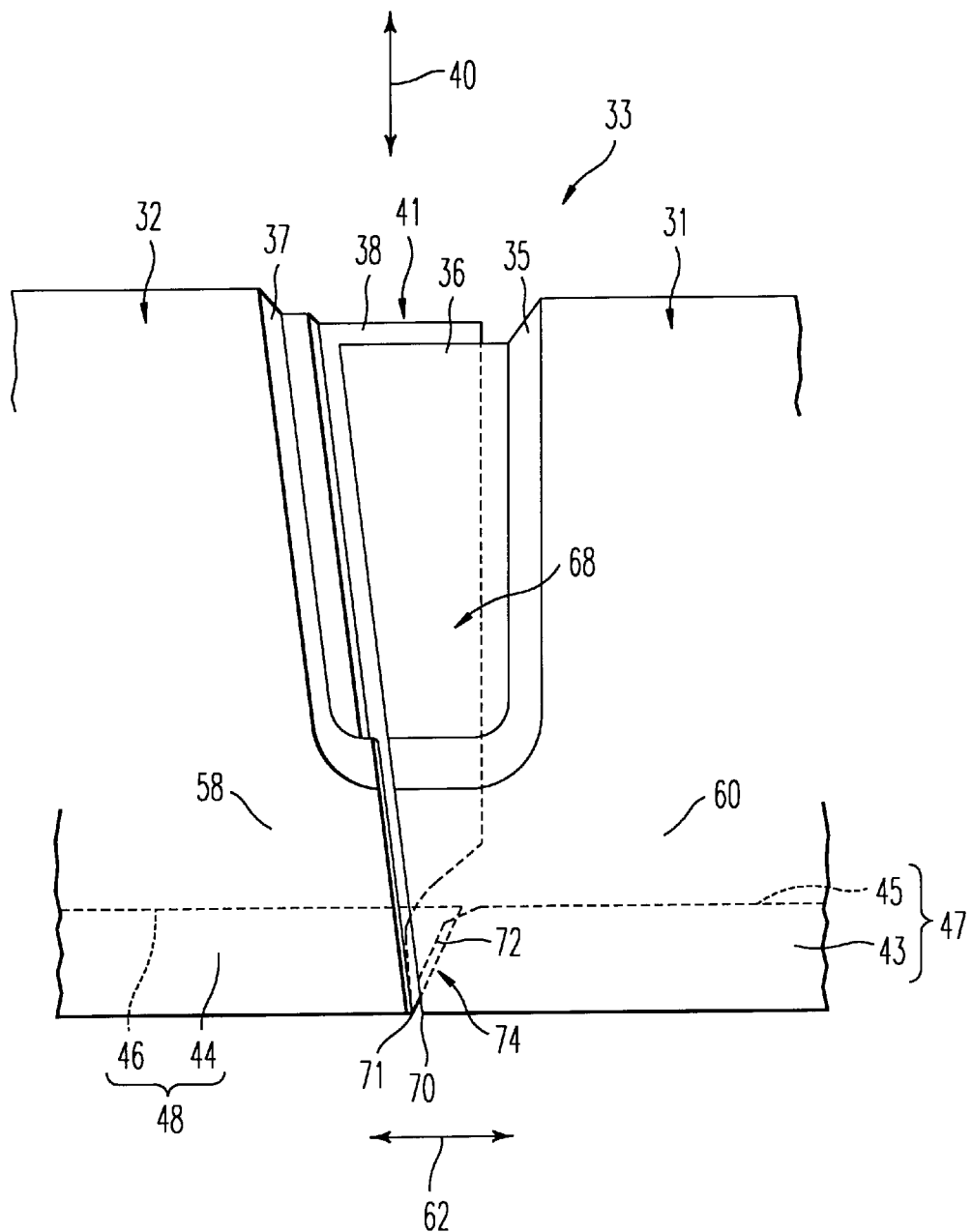
FIG. 14 is a plan view of a third embodiment of the present invention.
Figure 15:
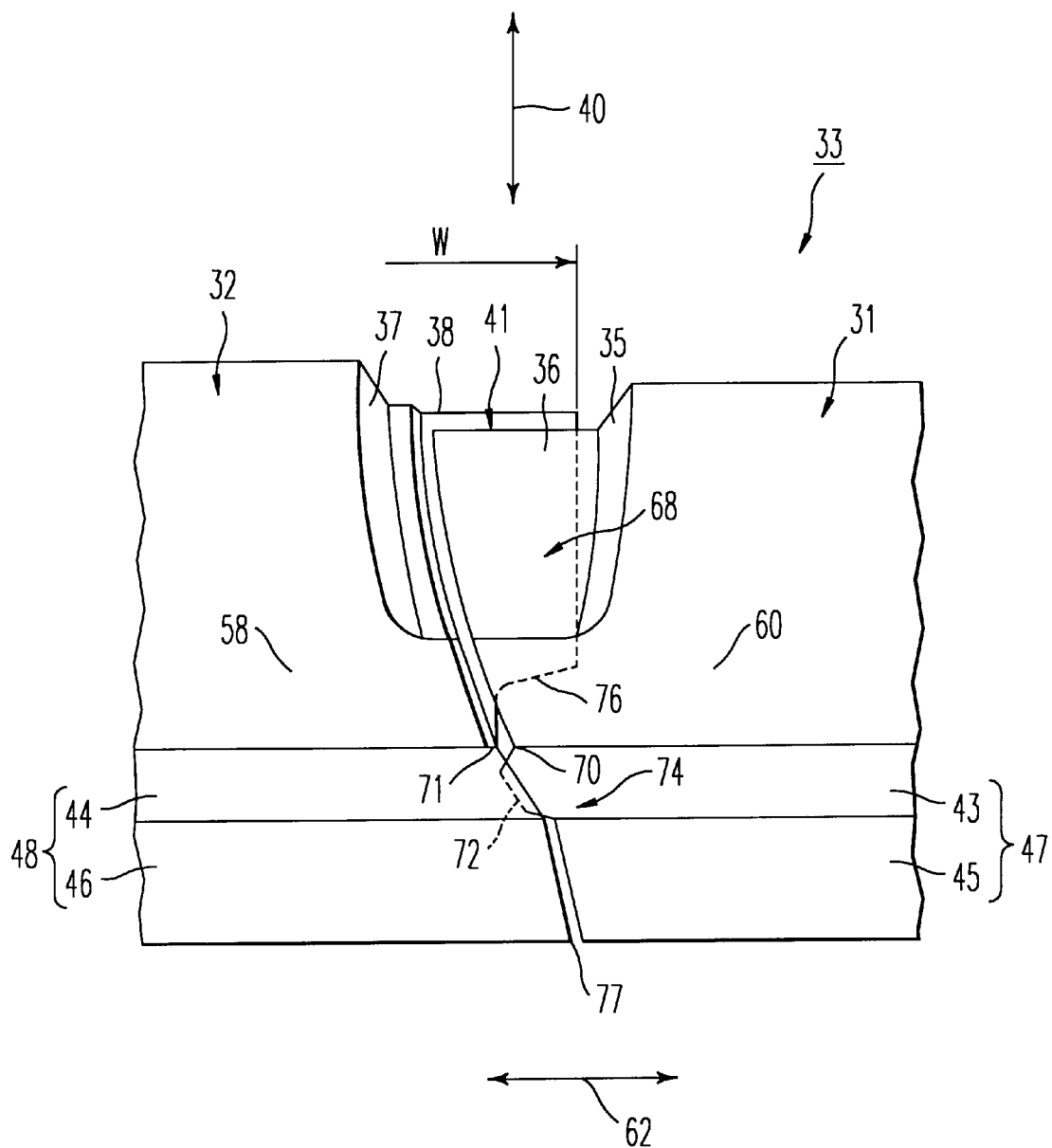
FIG. 15 is a partially enlarged view looking from below so as to show unexposed surface portions in FIG. 14.

FIGS. 14 and 15 show a third embodiment of the present invention. FIG. 14 is a plan view and FIG. 15 is a perspective view looking from below so as to show unexposed surface portions 48 and 47 in FIG. 14.

The third embodiment resides in that the side portion of the side outer member 32 which provides the overlap 68 is partly curved outwardly in the widthwise direction 62 at edge 76, i.e., at a position adjacent to the unexposed surface portion 48 to thereby offset the alignment of the corners 70 and 71 further outwardly in the widthwise direction 62 than in the case of the second embodiment shown in FIGS. 12 and 13 so that the member 32 is not, even at its lowermost point or edge 77, beyond its inherent width W necessary for the overlap 68. Only the inward bend 43 of the unexposed surface portion 47 of the member 31 has a lug 72 to provide a partial overlap 74.

In the third embodiment, the lower margins 46 and 45 of the unexposed surface portions 48 and 47 are in the form of abutments which are abutted and joined together.

In this manner, the unexposed surface portion 48 of the side outer member 32 is not beyond the width W of the member 32 necessary for the overlap 68, i.e., the inherent width W of the member 32 necessary for construction of the roof structure with no drip channel, so that the yield in manufacture of the side outer member 32 can be substantially improved.

It is to be understood that the present invention is not limited to the above embodiments and that various changes and modifications may be made without departing from the spirit and the scope of the present invention.

What is claimed is:

1. A roof structure without a drip channel for a vehicle which comprises a side outer member and a roof member combined at side portions thereof to provide a groove extending over at least midway of a boundary between said members, each of said side outer and roof members having exposed and unexposed surface portions, each of said unexposed surface portions having an inward bend and a lower margin, said side outer and roof members being overlapped at their exposed surface portions to provide an overlap such that a corner defined by the exposed and unexposed surface portions of said roof member is substantially aligned with a corner defined by the exposed and unexposed surface portions of the side outer member, said unexposed surface portions of said side outer and roof members being diagonal toward a center of a roof in a widthwise direction of the roof as the unexposed surface portions are away from said corners, at least one of said inward bends and lower margins of said side outer and roof members having a lug for overlap to provide a partial overlap.

2. A roof structure according to claim 1 wherein the side portion of the side outer member which provides the overlap is partly curved outwardly in the widthwise direction at a position adjacent to the unexposed surface portion of the member to thereby offset the alignment of the corners between the exposed and unexposed portions of the side outer and roof members outwardly in the widthwise direction.

3. A roof structure according to claim 1 wherein the side portion of the side outer member which provides the overlap is partly curved outwardly in the widthwise direction at a position adjacent to the unexposed surface portion of the member to thereby offset the alignment of the corners between the exposed and unexposed portions of the side outer and roof members outwardly in the widthwise direction so that the side outer member does not extend widthwise inwardly, even at its lowermost edge, beyond the widthwise inner edge of the groove.

* * * * *